United States Patent
Carroll (10) Patent No.: US 7,032,171 B1
(45) Date of Patent: *Apr. 18, 2006

(54) SYSTEM AND METHOD FOR SELECTING AND PROCESSING INFORMATION IN AN ELECTRONIC DOCUMENT

(75) Inventor: Michael Carroll, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/425,177

(22) Filed: Oct. 22, 1999

Related U.S. Application Data (60) Provisional application No. 60/114,573, filed on Dec. 31, 1998.

(51) Int. Cl.
*G06F 17/00* (2006.01)

(52) U.S. Cl. ...................... 715/521; 715/520

(58) Field of Classification Search ............... 715/539, 715/520, 521, 531, 764, 780, 821, 822, 823, 715/824, 856; 345/764, 780, 821, 822, 823, 345/824, 856
See application file for complete search history.

(56) References Cited

U.S. PATENT DOCUMENTS

| | | | | |
|---|---|---|---|---|
| 4,815,029 A | 3/1989 | Barker et al. | ............... | 364/900 |
| 4,924,433 A | 5/1990 | Hirata et al. | ............... | 364/900 |
| 5,157,763 A | 10/1992 | Peters et al. | ............... | 395/157 |
| 5,367,625 A | 11/1994 | Ishitani | ............... | 395/159 |
| 5,375,200 A | 12/1994 | Dugan et al. | ............... | 395/159 |
| 5,386,494 A | 1/1995 | White | ............... | 395/2.84 |
| 5,425,141 A | 6/1995 | Gedye | ............... | 395/157 |
| 5,442,742 A | 8/1995 | Greyson et al. | ............... | 395/146 |
| 5,479,596 A | 12/1995 | Capps et al. | ............... | 395/148 |
| 5,566,248 A | 10/1996 | Ulrich | ............... | 382/187 |
| 5,644,692 A * | 7/1997 | Eick | ............... | 345/833 |
| 5,659,791 A | 8/1997 | Nakajima et al. | ............... | 395/802 |
| 5,664,210 A * | 9/1997 | Fleming et al. | ............... | 715/531 |
| 5,666,552 A * | 9/1997 | Greyson et al. | ............... | 715/539 |
| 5,677,710 A | 10/1997 | Thompson-Rohrlich | .... | 345/173 |
| 5,832,528 A | 11/1998 | Kwatinetz et al. | ............... | 707/500 |
| 5,835,919 A | 11/1998 | Stern et al. | ............... | 707/515 |
| 5,867,144 A | 2/1999 | Wyard | ............... | 345/146 |
| 5,930,813 A | 7/1999 | Padgett et al. | ............... | 707/539 |
| 6,108,668 A * | 8/2000 | Bates et al. | ............... | 707/203 |
| 6,151,426 A * | 11/2000 | Lee et al. | ............... | 382/319 |
| 6,185,591 B1 * | 2/2001 | Baker et al. | ............... | 715/531 |

(Continued)

OTHER PUBLICATIONS

Microsoft Windows User's Guide, 1992, Microsoft Corporation, pp. 96-97.*

(Continued)

*Primary Examiner*—Sanjiv Shah
(74) *Attorney, Agent, or Firm*—Pillsbury Winthrop Shaw Pittman, LLP (57) ABSTRACT

A system and method processes selected regions in an electronic text to edit the selected region on a continuous basis, without destroying the original highlighting and forcing the user to re-bracket the entire section. The user can extend, retract, and separate selected regions. These selected regions can then be universally processed with any function available to the processor, including highlighting, printing, copying, deleting, or spell checking. The invention economizes on keystrokes and cursor actions, since the whole region of text desired to be highlighted does not have to be rebuilt every time a change is made. The invention also enables a user to select text by moving a cursor from left to right and top to bottom, and to deselect text by moving a cursor from right to left and bottom to top.

25 Claims, 8 Drawing Sheets

U.S. PATENT DOCUMENTS 6,240,430 B1 * 5/2001 Deike et al. ............ 715/539
6,683,631 B1 * 1/2004 Carroll ................. 345/821

OTHER PUBLICATIONS

Introducing Microsoft Windows 95, 1995, Microsoft Corporation, p. 27.*

Microsoft Windows 95 application "screenshots", 1995, Microsoft Corporation, pp. 1-3.*

Sybex, Inc. "The ABCs of Word 97", 1997, Second Edition, pp. 10-12 and pp. 43-44.*

Microsoft Word 97 application "screenshots", 1997, Microsoft Corporation, pp. 1-5.*

"Microsoft Word 97", 1997, Catapult, Inc., pp. 44-45.*

* cited by examiner

SYSTEM AND METHOD FOR SELECTING AND PROCESSING INFORMATION IN AN ELECTRONIC DOCUMENT

RELATED APPLICATIONS

This application claims priority based on U.S. Provisional Patent Application Ser. No. 60/114,573, entitled "System and Method for Selectively Highlighting Portions of a Document," filed Dec. 31, 1998. This application is also related to co-pending U.S. Patent application 09/422,975, "System and Method for Selecting and Deselecing Information in an Electronic Document," filed herewith.

FIELD OF THE INVENTION

The invention relates to the processing of electronic information, and more particularly to processing non-contiguous regions of documents without the necessity of re-marking the boundaries of selected areas.

BACKGROUND OF THE INVENTION

The widespread acceptance of modern word processing and graphics systems has increased the demand for electronic document manipulation features. One common and even expected feature on word processing packages and other software applications is the ability to select regions of an electronic document. The selected region may be then processed by functions such as copy to a buffer, print or cut.

In current applications, selection is generally performed by initiating a select function, manipulating a position indicator, and terminating the select function. The initiation and termination of the select function can be accomplished by a number of techniques, including keystroke input and mouse input. When the electronic document is text-based, then the common convention is to indicate a live end and an anchor end. The location at which the select function was initiated serves as the anchor end, while the location at which the select function was terminated serves as the live end. All text between the anchor end and the live end are selected. Once a region has been selected, limited manipulation of the selected region is available.

In word processing technologies, for example, one limitation is that the actual selection of the region of the document which the user wishes to select is not convenient. Specifically, in known word processing applications the user must first place a positional indicator, such as a cursor, at the beginning of a region of text he or she wishes to select, initiate the select function such as by clicking a mouse, and then move to the intended end of the selected region. However, if the user wishes to process noncontiguous regions of information, the user must select each of the noncontiguous regions separately. Other drawbacks exist. More convenient, intuitive and faster technology for manipulating textual information is desirable.

SUMMARY OF THE INVENTION

The invention overcoming these and other problems in the art relates to a system and method for processing target information within an electronic document which permits a user to select target information regions and deselect separating information regions of an electronic document in one continuous operation. The target information is the information that is to be selected and processed by a particular computer function. In a preferred embodiment, the invention achieves this processing flexibility in part by a method that selects text when a cursor is operated in one direction and deselects text when a cursor is operated in another direction.

An object of the invention is to provide a system and method that allows users to process target information when the target information regions are noncontiguous without having to select and process each of the noncontiguous target information regions separately.

Another object of the invention is to increase user efficiency by selecting text when a positional indicator is manipulated in one direction and deselecting text when a positional indicator is manipulated in a second direction.

An object of the invention is to provide a system and method that allows users to process target graphical information, in which movements of a positional indicator in one direction will serve to select the associated graphical information whereas movements of a positional indicator in another direction will serve to deselect the associated graphical information. In all embodiments, selected information can be modified without the loss of the original selected text.

Another object of the invention is to provide a system and method that permits a user to make a first selection, perform a process, and then make further modifications to the first selection.

DETAILED DESCRIPTION OF PREFERRED EMBODIMENTS

Figure 1:
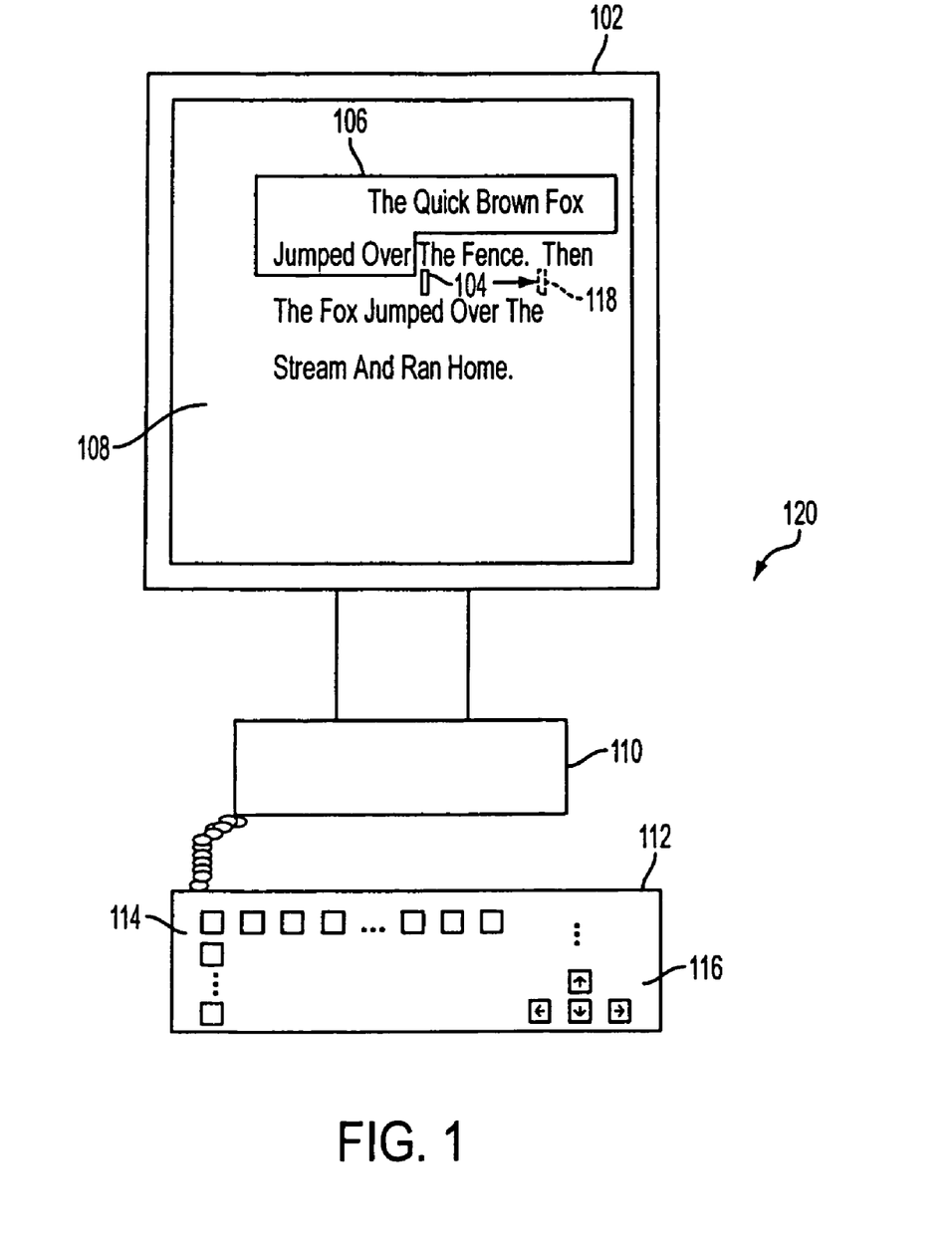
FIG. 1 is an illustration of a computer workstation processing an electronic document according to the invention.

The invention will be described with respect to a workstation 120 at which a user processes an electronic text 108. Workstation 120 includes a display screen 102, such as a computer display screen, which displays electronic text 108. Display screen can be a CRT. LCD or other type of computer or other display. Workstation 120 includes a central processing unit 110, which may contain a controller operating under programmed control, storage and memory connected by an electronic bus and related circuitry (not shown) that will be appreciated by persons skilled in the art. Workstation 120 for instance can be a personal computer running the Microsoft Windows™95, 98 or NT™ operating systems, or Linux, Unix or other operating systems.

Display 102 displays the electronic text 108 to the user and receives input from the user to manipulate the text and its characteristics. In the embodiment illustrated in FIG. 1, the input devices to the central processing unit 110 include a keyboard 112, although it will be appreciated that other types of input devices, such as mice, trackballs, microphones with speech to text converters and others are contemplated for use by the invention. Keyboard 112 includes a set of keys 114, including a set of alphanumeric keys such as the QWERTY keyboard, and cursor arrow keys 116. Cursor arrow keys 116 have arrows indicating directions marked on them, and striking those keys causes a cursor 104 displayed on display 102 to move in a corresponding direction, as understood by persons skilled in the art.

In a preferred embodiment, the electronic document is a text-based document 108 as illustrated in FIG. 1. In FIG. 1, the user has selected a region of the text 106. This region is selected by any method well known in the art. For example, a user could use a keyboard, a mouse, or a stylus to indicate the terminal points of the selected region. In a preferred embodiment, the selected region 106 is represented as a highlighted region. Selected region 106 may be shown on display 102 in a different color, in a different intensity or otherwise displayed as a distinct region within electronic text 108. The edge of the selected region can either be designated as an HTML style text tag, such as <select>, or it can be a visual representation, such as a marker or an edge to a visually highlighted region. In the illustrated embodiment the user wishes to extend the selected region 106 to the end of the sentence. A positional indicator, which in a preferred embodiment is a cursor 104, is located at the edge of the selected region adjacent to the terminal point.

Figure 2:
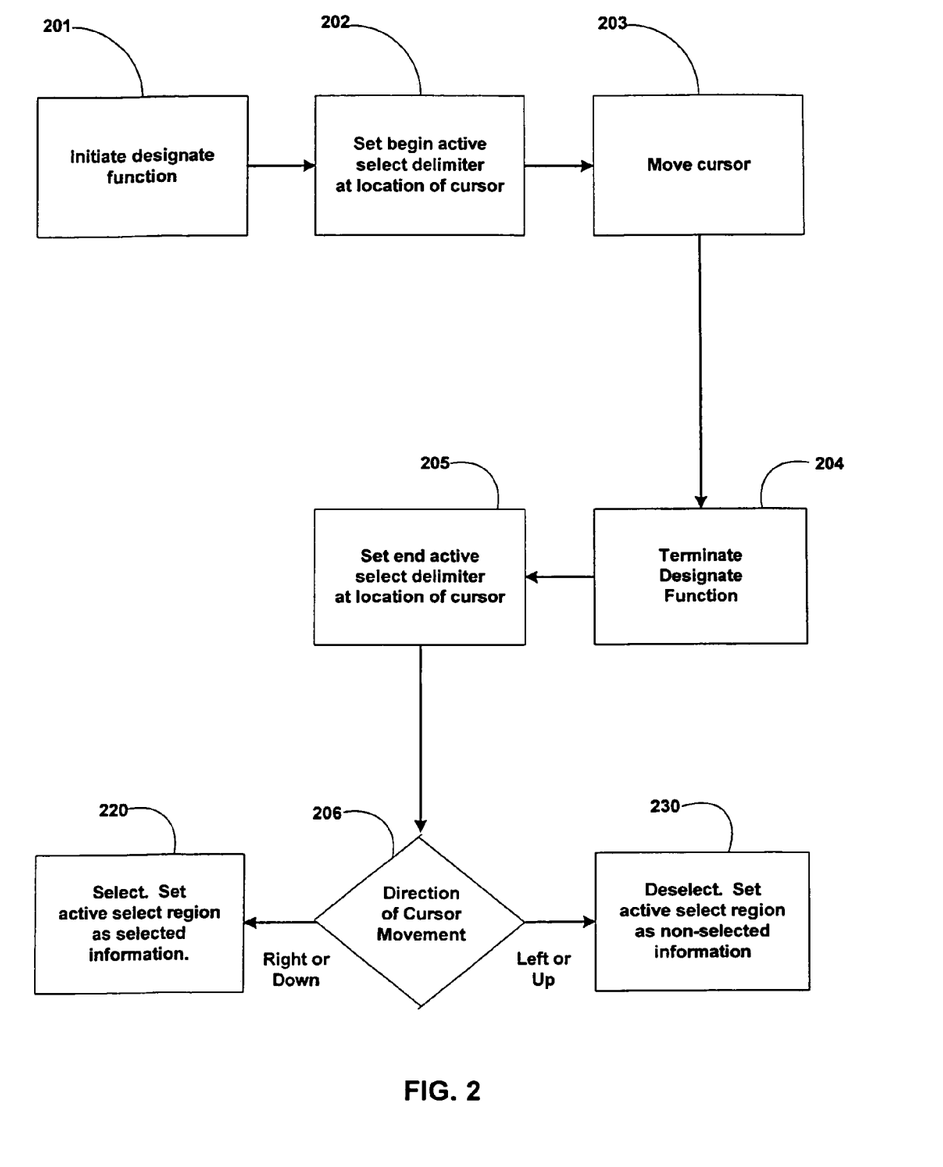
FIG. 2 depicts a flowchart of the steps performed by a preferred embodiment of the present invention.

FIG. 2 depicts a high-level flow chart of the steps performed by a preferred embodiment of the present invention. The first step is to receive input which initiates the select function (step 201). This step can be implemented with a predetermined set of keystrokes, depression of a mouse key, or other mechanisms known in the art. Once the select function is initiated, a begin active select delimiter is created at the location of the positional indicator (step 202). Further input is accepted to move the positional indicator (step 203). As the positional indicator is moved, it creates an active select region between the begin active select delimiter and the cursor. In a preferred embodiment, the electronic document is a textual document, and the selection process selects text along lines of a written page as is well known in the art. The active select region preferably has a different appearance than text outside of this region. Once the positional indicator is in the desired location, input is accepted to terminate the select function (step 204).

Once the select function is terminated, an end active select delimiter is set at the current position of the cursor (step 205). In a preferred embodiment, information is selected when the begin active select delimiter is to the left of or above the end active select delimiter (step 220). If the information was previously selected, then it will remain selected. If regions of the active select region were previously selected whereas regions of the active select region were non-selected, then the entire region is preferably selected. In a preferred embodiment information is deselected when the begin active select is to the right of or below the end active select delimiter (step 230). If the information was non-selected, then it will remain non-selected. If the information contained in the active select region was partially selected, then the entire region will be deselected. In a preferred embodiment, selected information will have visually distinguishable features, such as highlighting.

Figure 3:
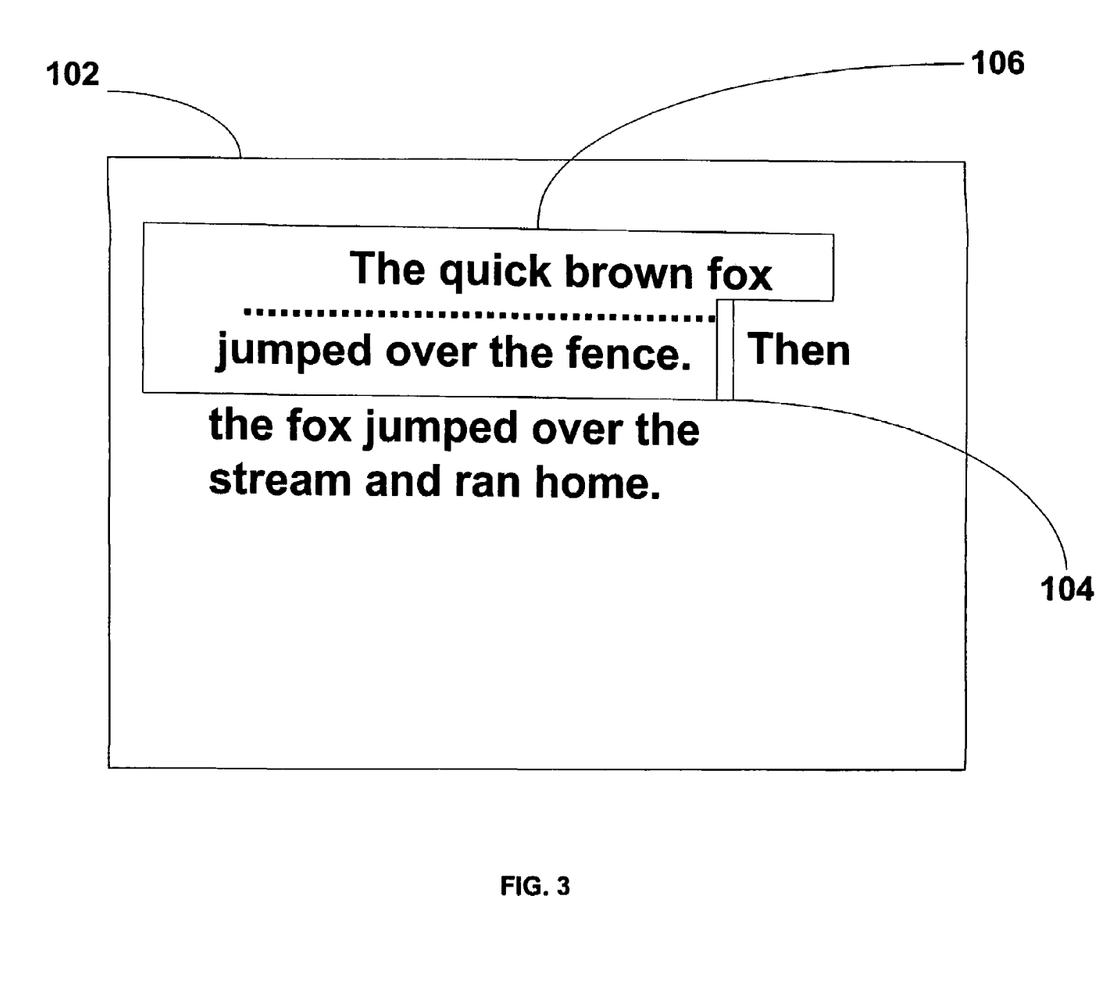
FIG. 3 is an illustration of an electronic text document in which a selected region has been expanded according to the invention.

FIG. 3 provides an illustration of the present invention. The positional indicator, preferable a cursor 104, is positioned at the edge of the selected region 106. The selected region 106 is preferably highlighted to distinguish it from other non-selected regions. By striking a predetermined set of keystrokes on keys 114, the user preferably creates a begin active select delimiter. The set of keystrokes might be, for example, the depression of the "Control" key and holding that key down while hitting the "S" key, for selecting. Once the predetermined set of keystrokes is input, the cursor 104 can be moved by pressing the cursor arrow keys 116 to cause the cursor 104 to slide to the desired location 118. While the select function is on, each word between the begin select tag and the cursor is known as the active select region. Preferably, the active select region is displayed in a different manner than both the selected region and the non-selected region. For example, while the selected region is presented as a highlighted region of a particular color, the active select region is preferably presented as a highlighted region of another color.

When the user sees the edit cursor 118 at the position he or she desires, then the user provides user input to terminate the select function. For example, in a preferred embodiment, the user may strike a second set of predetermined keystrokes to indicate that the new position of the edit cursor is the point at which termination of the selected region is desired. This second set of keystrokes may be the same Control/S keystroke as the first set, or another according to particular implementations. Once the select function is terminated, an end active select delimiter is inserted at the location of the cursor 104. In FIG. 3, the begin active select delimiter is inserted to the right or below the end active select delimiter. Therefore, the active select region is converted to a selected region having a similar appearance to the previously selected region.

Figure 4:
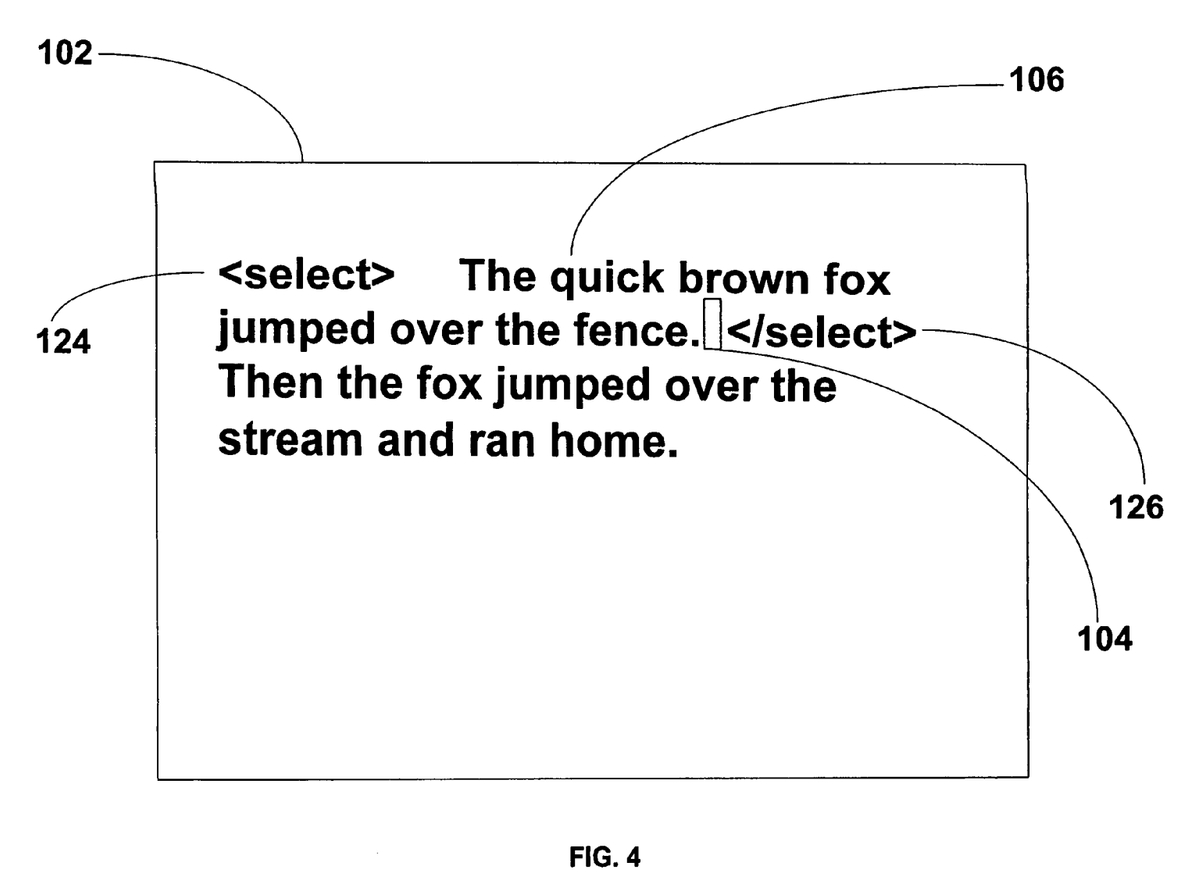
FIG. 4 is an illustration of embedded delimiter tags within the electronic text document processed according to the invention.

As illustrated in FIG. 4, in one embodiment the activation of the first set of keystrokes to execute the selective highlighting of the invention works to modify a pair of embedded delimiter tags 124, 126. Embedded delimiter tag 124 is shown as a begin tag, while embedded delimiter tag 126 is shown as an end tag, and each is shown in Hyper Text Markup Language (HTML) format. It will be appreciated however that other types of document delimiters and conventions for highlighting are contemplated. It is further contemplated that by inserting additional delimiter tags between the embedded delimiter tags 124 and 126, non-contiguous regions of information, such as text, could be selected for further processing.

The invention also contemplates the preparation and storage of computer software in a machine-readable format such as a floppy or other magnetic, optical or other drive, which upon execution carries out the selective highlight actions of the invention.

Figure 5:
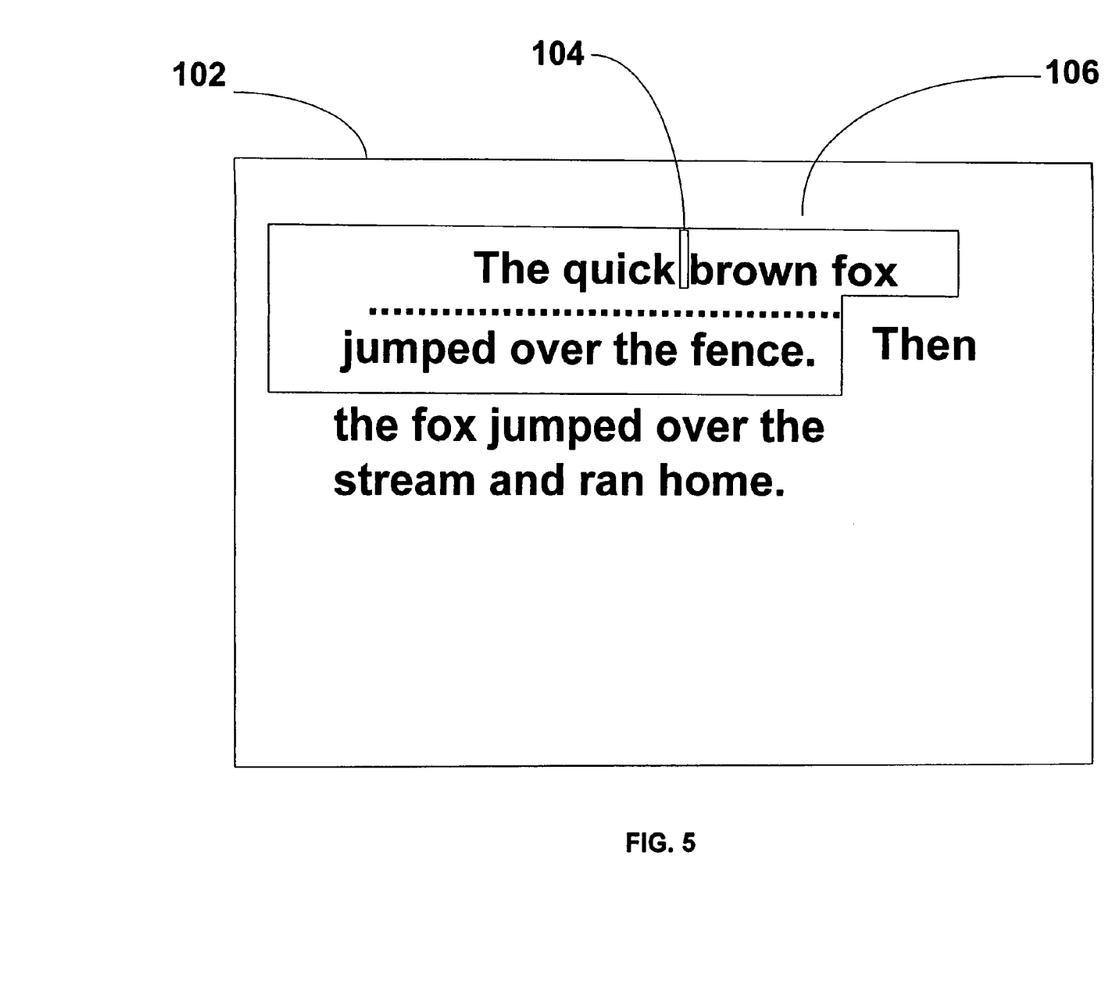
FIG. 5 is an illustration of an embodiment of the invention before a region of text is deselected.
Figure 6:
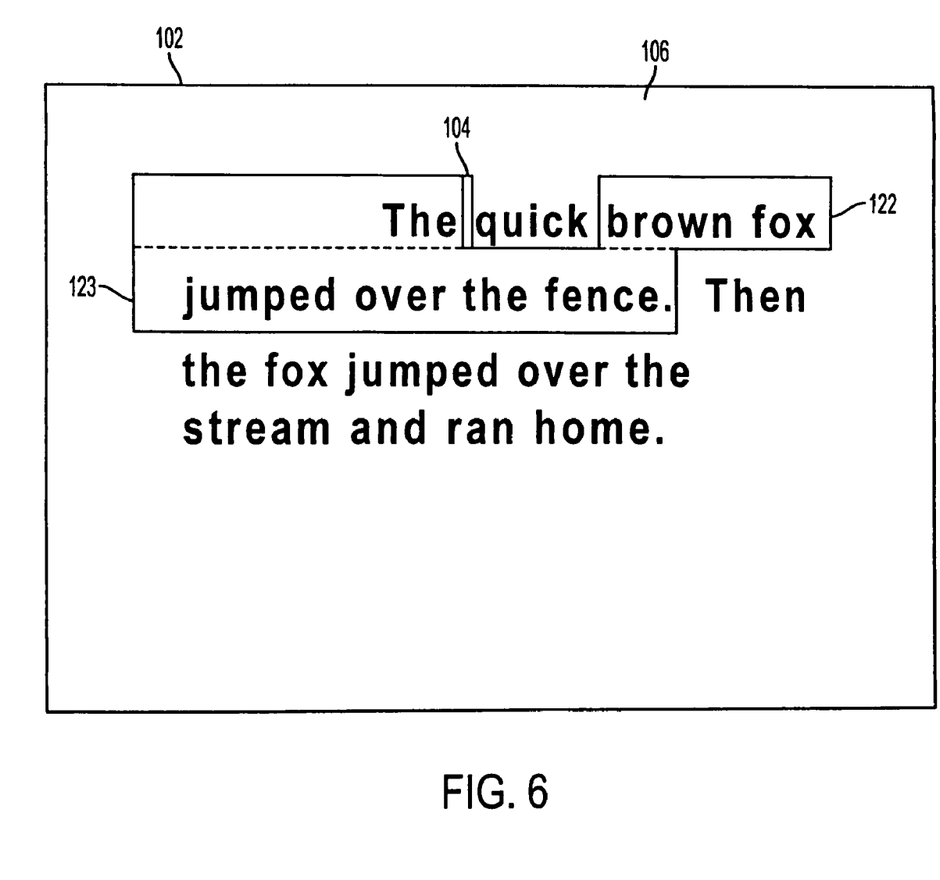
FIG. 6 is an illustration of an embodiment of the invention after a region of text is deselected.

FIGS. 5 and 6 illustrate information being deselected with the present invention. Specifically, FIGS. 5 and 6 demonstrate deselecting of the word "quick." In FIG. 5, the cursor 104 is moved to a position to the right of "quick." The select function is then initiated by a keystroke combination, clicking a mouse button, or other input mechanism. Initiation of the select function creates a begin active select delimiter in the location of the cursor 104. The cursor 104 is then moved to the left until the cursor 104 is located to the right of the word "quick." As the cursor is moved to the left, each of the letters between the cursor 104 and the begin active select delimiter are preferably displayed in a different color than both the selected region and the non-selected region.

Once the cursor 104 is in the desired position, the select function is then terminated by a keystroke combination, clicking a mouse button, or other input mechanism. Because the begin active select delimiter is to the right of the end active select delimiter, the active select region is deselected, as displayed in FIG. 6. The deselecting is preferably implemented by inserting an end select delimiter to the right of the first information target region ("The"), and inserting a begin select delimiter to the left of the second information target region ("brown fox jumped over the fence").

The steps presented in FIG. 2 can be repeated until all of the target information is selected and nothing but target information is selected, as depicted in FIGS. 5 and 6. Furthermore, the content of the target information can be process dependent. For example, the target information for a print process could consist of the words "The quick brown fox jumped over the fence," as depicted in FIG. 3. Then, for a copy process, the target information could consist of the words "The" and "brown fox jumped over the fence," as shown in FIG. 6. The target information can exist on different pages, on different documents, and in different applications. Once all of the target information has been selected, then the user can process the information in accordance with any available functions. For example, the user could print, copy, or delete the selected text.

Figure 7:
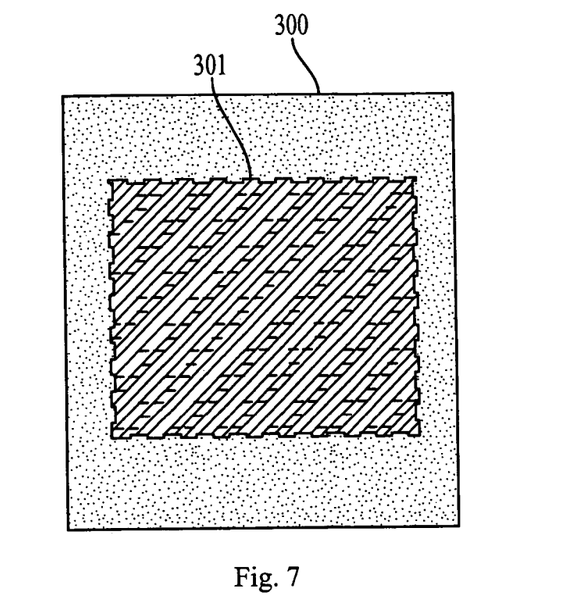
FIG. 7 is an illustration of a graphical-based embodiment of the present invention displaying a first selected region.
Figure 8:
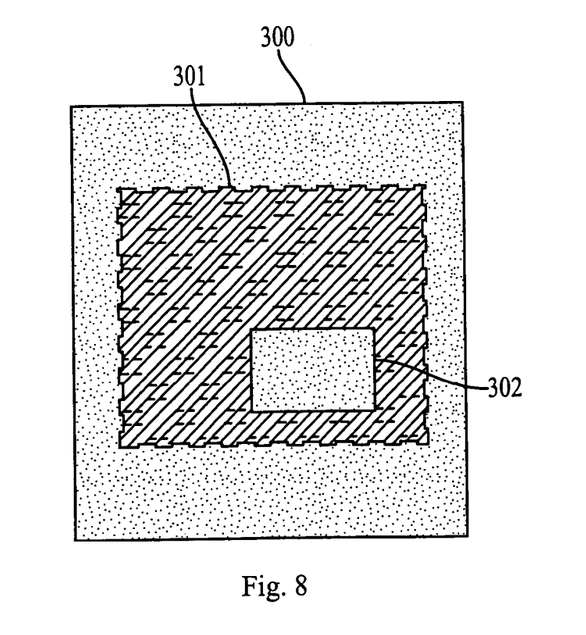
FIG. 8 is an illustration of a graphical-based embodiment of the present invention displaying a first selected region and a second deselected region.
Figure 9:
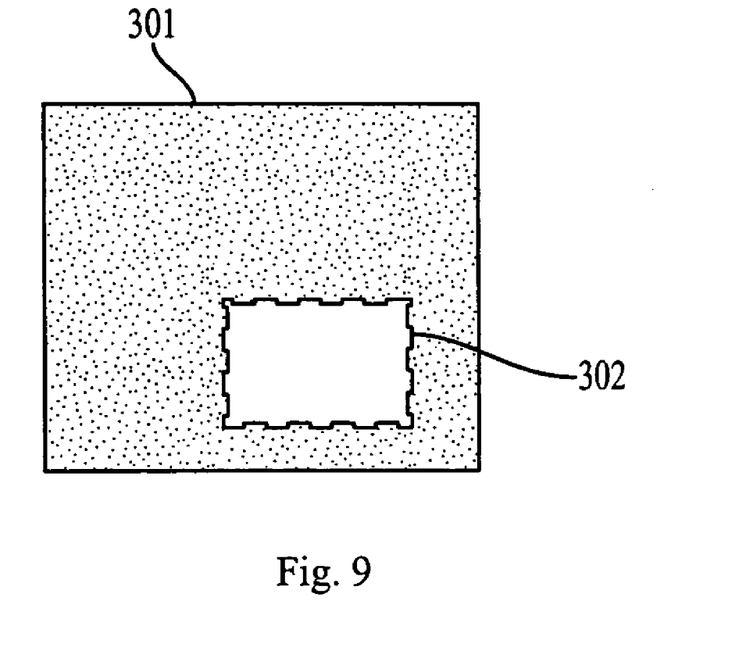
FIG. 9 is an illustration of the output of a graphical-based embodiment of the present invention.

FIGS. 7, 8 and 9 depict an embodiment of the present invention applied to a graphically-based document 300. In FIG. 7, the user has selected region 301 by placing a cursor at the upper left corner of selected region 301, initiating a select function, and moving the positional indicator to the lower right corner of the selected region 301. Once the boundaries of the selected region 301 are set, the select function is terminated by, for example, a keystroke combination. The selected region 301 can be portrayed in different color, having a predetermined boundary, or otherwise distinguished from non-selected region.

FIG. 8 depicts a deselected region 302. Deselected region 302 is designated by positioning the positional indicator at the lower right corner of the deselected region 302, initiating the select function, moving the positional indicator to the upper left corner of the deselected region, and terminating the select function. The deselected region 302 can be portrayed in different color, having a predetermined boundary, or otherwise distinguished from selected region. Once the target region has been selected, the user can then process the information as required. For example, the user could cut the selected information 301 and paste it to a new location, as shown in FIG. 9.

The foregoing description of the system and method of the invention is illustrative and, variations in configuration and implementation will occur to persons skilled in the art. For instance, while the adjustment of the selected region has been described as enlarging and deselecting, it is also contemplated that a user could modify information that is not proximal to the selected text, such as information contained on different pages or in different files. Furthermore, the invention has been described as selecting information when the positional indicator is moved in a first set of directions and deselecting when the positional indicator is moved in a second set of directions. These sets of directions could be adjusted, either by adjustments to the programming code or by integrating an interface that enables a user to establish the function associated with the a particular input. The scope of the invention is intended to be limited only by the following claims.

The invention claimed is:

1. A method of processing at least two associated noncontiguous target information regions within an electronic document generated by a word-processing application, the method comprising the steps of:

accepting input to select a continuous target information region within the electronic document;

accepting input to deselect at least one portion of the continuous target information region to form the at least two associated noncontiguous target information regions, wherein the at least two associated noncontiguous target information regions remain selected; and accepting input to process the at least two selected associated noncontiguous target information regions according to a selected function, wherein the deselected portion is not processed according to the selected function.

2. The method of claim 1, wherein the continuous target information region comprises text.

3. The method of claim 2, wherein accepting input to select the continuous target information region comprises storing locations of a first begin select delimiter located left of the continuous target information and a first end select delimiter located right of the continuous target information region.

4. The method of claim 3, wherein accepting input to deselect at least one portion of the continuous target information region comprises storing locations of a second end select delimiter that is located between the first begin select delimiter and first end select delimiter and a second begin select delimiter that is between the second and first end select delimiters.

5. The method of claim 1, further comprising accepting input for creating additional associated noncontiguous target information regions.

6. The method of claim 1, further comprising accepting further input to change content of the at least two associated noncontiguous target information regions.

7. The method of claim 1, wherein the electronic document comprises graphical information.

8. The method of claim 7, wherein the continuous target information region and the at least one portion of the continuous target information region that is deselected are each defined by a rectangle, each rectangle having two delimiters located at opposite corners.

9. A system for processing at least two associated noncontiguous target information regions within an electronic document generated by a word-processing application, comprising:

an input interface to accept input to select a continuous target information region within the electronic document and input to deselect at least one portion of the continuous target information region to form the at least two associated noncontiguous target information regions, wherein the at least two associated noncontiguous target information regions remain selected; and a processor unit connected to the input interface, the processor unit processing the at least two selected associated noncontiguous target information regions according to a selected function, wherein the deselected portion is not processed according to the selected function.

10. The system of claim 9, wherein the continuous target information region comprises textual information.

11. The system of claim 9, wherein the processor unit stores a begin tag and an end tag for each of the at least two associated noncontiguous target information regions.

12. The system of claim 9, further comprising an output interface to transmit a display that shows the at least two associated noncontiguous target information regions in a different manner than the at least one deselected portion of the continuous target information region.

13. The system of claim 9, wherein the input interface accepts input from at least one of a keyboard, a speech to text converter, a mouse, a pressure pad and a trackball device.

14. The system of claim 9, wherein the input interface receives input for a positional indicator and the processor unit selects information when the positional indicator is moved in a first direction and deselects information when the positional indicator is moved in a second direction.

15. The system of claim 9, wherein the electronic document comprises graphical information.

16. A computer readable medium having computer readable program code embodied therein for selecting at least two associated noncontiguous information regions of an electronic document that are separated by at least one information separating region, wherein the electronic document is generated by a word-processing application, the computer readable program code in the computer usable medium comprising:

computer readable program code for causing a computer to accept input that selects a continuous target information region within the electronic document;

computer readable program code for causing a computer to accept further input that selects the at least one information separating region, wherein the at least one of the information separating regions is located within the continuous target information region to form the at least two associated noncontiguous target information regions, and wherein the at least two associated noncontiguous target information regions remain selected; and computer readable program code for causing a computer to process the at least two selected associated noncontiguous target information regions according to a selected function, wherein the deselected portion is not processed according to the selected function.

17. A system for processing noncontiguous target information within an electronic document generated by a word-processing application, the system comprising:

input means to accept input for selecting a continuous target information region within the electronic document and input for selecting at least one information separating region that divides the continuous target information region into at least two associated noncontiguous target information regions, wherein the at least two associated noncontiguous target information regions remain selected; and processor means operatively connected to the input means for processing the at least two selected associated noncontiguous target information regions according to a selected function, wherein the information separating region is not processed according to the selected function.

18. The system of claim 17, wherein the continuous target information region contains textual information.

19. The system of claim 17, wherein the processor means stores a begin tag and an end tag for each of the associated noncontiguous target information regions.

20. The system of claim 17, further comprising display means for displaying the at least two associated noncontiguous target information regions in a different manner than the at least one information separating region.

21. A method of processing at least two associated noncontiguous target information regions within an electronic document generated by a graphics based application, the method comprising the steps of:

accepting input to select a continuous target information region within the electronic document;

accepting input to deselect at least one portion of the continuous target information region to form the at least two associated noncontiguous target information regions, wherein the at least two associated noncontiguous target information regions remain selected; and accepting input to process the at least two selected associated noncontiguous target information regions according to a selected function, wherein the deselected portion is not processed according to the selected function.

22. A method of processing at least two associated noncontiguous target information regions within a text-based electronic document, the method comprising the steps of:

accepting input to select a continuous target information region within the text-based electronic document;

accepting input to deselect at least one portion of the continuous target information region to form the at least two associated noncontiguous target information regions, wherein the at least two associated noncontiguous target information regions remain selected;

and accepting input to process the at least two selected associated noncontiguous target information regions according to a selected function, wherein the deselected portion is not processed according to the selected function.

23. A method of processing at least two noncontiguous target information regions within an electronic document, the method comprising the steps of:

accepting input to select a first continuous target information region within the electronic document;

accepting input to select a second continuous target information to form the at least two noncontiguous target information regions, wherein the first continuous target information region remains selected; and accepting input to process the selected at least two noncontiguous target information regions according to a selected function.

24. A method of processing at least two associated noncontiguous target information regions within two or more documents or two or more applications, the method comprising the steps of:

accepting input to select a target information region within the two or more documents of two or more applications;

accepting input to deselect at least one portion of the target information region to form the at least two associated noncontiguous target information regions, wherein the at least two associated noncontiguous target information regions remain selected; and accepting input to process the at least two selected associated noncontiguous target information regions according to a selected function.

25. The method of claim 24, wherein accepting input to select a target information region comprises accepting input to move a positional indicator in a first direction and accepting input to deselect at least one portion of the target information region comprises moving the positional indicator in a second direction.

* * * * *